United States Patent [19]

Harris et al.

[11] Patent Number: 5,079,309
[45] Date of Patent: Jan. 7, 1992

[54] MISCIBLE BLENDS OF A POLY(ARYL ETHER KETONE) AND AN IMIDE CONTAINING POLYMER

[75] Inventors: James E. Harris, Piscataway, N.J.; Lloyd M. Robeson, Macungie, Pa.; Michael D. Cliffton, Martinez, Ga.; Bernard H. Eckstein, North Royalton, Ohio; Markus Matzner, Edison, N.J.

[73] Assignee: Amoco Corporation, Chicago, Ill.

[21] Appl. No.: 378,784

[22] Filed: Jul. 12, 1989

Related U.S. Application Data

[63] Continuation of Ser. No. 945,799, Dec. 24, 1986, abandoned, and a continuation-in-part of Ser. No. 933,422, Nov. 21, 1986, abandoned, which is a continuation of Ser. No. 757,933, Jul. 23, 1985, abandoned.

[51] Int. Cl.$^5$ .............................................. C09L 77/06
[52] U.S. Cl. ....................................... 525/435; 525/436
[58] Field of Search ............... 525/420, 928, 432, 435, 525/436

[56] References Cited

U.S. PATENT DOCUMENTS 4,250,279  2/1981  Robeson et al. ................... 525/420

Primary Examiner—Jacob Ziegler
Attorney, Agent, or Firm—Richard J. Schlott; William H. Magidson; Ralph C. Medhurst

[57] ABSTRACT

Described herein are miscible blends of a poly(aryl ether ketone) and an imide-containing polymer which are useful in the manufacture of extruded film, continuous fiber composites and injection molded articles.

4 Claims, No Drawings

MISCIBLE BLENDS OF A POLY(ARYL ETHER KETONE) AND AN IMIDE CONTAINING POLYMER

REFERENCE TO TWO PREVIOUS APPLICATIONS

This is a continuation of application Ser. No. 945,799, filed Dec. 24, 1986, and a continuation in part of Ser. No. 933,422, filed Nov. 21, 1986, which in turn is a continuation of Ser. No. 757,933, filed July 23, 1985 now all abandoned.

FIELD OF THE INVENTION

This invention relates to miscible blends of a poly(aryl ether ketone) and an imide containing polymer which are useful in the manufacture of extruded film, continuous fiber composites and injection molded articles.

BACKGROUND OF THE INVENTION

Poly(aryl ether ketone)s are a known class of engineering polymers. Several poly(aryl ether ketone)s are highly crystalline with melting points above 300° C. Two of these crystalline poly(aryl ether ketone)s are commercially available and are of the following structure.

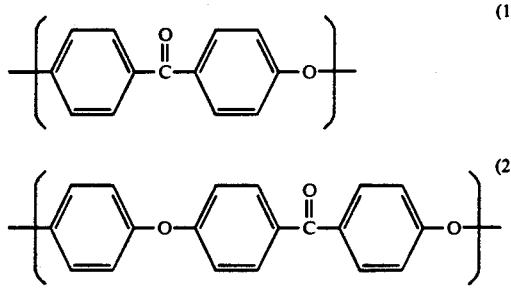

Over the years, there has been developed a substantial body of patent and other literature directed to formation and properties of poly(aryl ethers) (hereinafter called "PAE"). Some of the earliest work, such as by Bonner, U.S. Pat. No. 3,065,205, involves the electrophilic aromatic substitution (e.g., Friedel-Crafts catalyzed) reaction of aromatic diacylhalides with unsubstituted aromatic compounds such as diphenyl ether. The evolution of this class to a much broader range of PAE's was achieved by Johnson et al., Journal of Polymer Science, A-1, vol. 5, 1967, pp. 2415-2427; Johnson et al., U.S. Pat. Nos. 4,107,837 and 4,175,175. Johnson et al. show that a very broad range of PAE can be formed by the nucleophilic aromatic substitution (condensation) reaction of an activated aromatic dihalide and an aromatic diol. By this method, Johnson et al. created a host of new PAE's including a broad class of poly(aryl ether ketones), hereinafter called "PAEK'S".

In recent years, there has developed a growing interest in PAEK's as evidenced by Dahl, U.S. Pat. No. 3,953,400; Dahl et al., U.S. Pat. No. 3,956,240; Dahl, U.S. Pat. No. 4,247,682; Rose et al., U.S. Pat. No. 4,320,224; Maresca, U.S. Pat. No. 4,339,568; Atwood et al., Polymer, 1981, vol. 22, August, pp. 1096-1103; Blundell et al., Polymer, 1983, vol. 24, August, pp. 953-958, Atwood et al., Polymer Preprints, 20, No. 1, April 1979, pp. 191-194; and Rueda et al., Polymer Communications, 1983, vol. 24, September, pp. 258-260. In early to mid-1970, Raychem Corp. commercially introduced a PAEK called Stilan ™, a polymer whose acronym is PEK, each ether and keto group being separated by 1,4-phenylene units. In 1978, Imperial Chemical Industries PLC (ICI) commercialized a PAEK under the trademark Victrex PEEK. As PAEK is the acronym of poly(aryl ether ketone), PEEK is the acronym of poly(ether ether ketone) in which the 1,4-phenylene units in the structure are assumed.

Thus, PAEK's are well known; they can be synthesized from a variety of starting materials; and they can be made with different melting temperatures and molecular weights. The PAEK's are crystalline, and as shown by the Dahl and Dahl et al. patents, supra, at sufficiently high molecular weights they can be tough, i.e., they exhibit high values ($>50$ ft-lbs/in$^2$) in the tensile impact test (ASTM D-1822). They have potential for a wide variety of uses, but because of the significant cost to manufacture them, they are expensive polymers. Their favorable properties class them in the upper bracket of engineering polymers.

PAEK's may be produced by the Friedel-Crafts catalyzed reaction of aromatic diacylhalides with unsubstituted aromatic compounds such as diphenyl ether as described in, for example, U.S. Pat. No. 3,065,205. These processes are generally inexpensive processes; however, the polymers produced by these processes have been stated by Dahl et al., supra, to be brittle and thermally unstable. The Dahl patents, supra, allegedly depict more expensive processes for making superior PAEK's by Friedel-Crafts catalysis. In contrast, PAEK's such as PEEK made by nucleophilic aromatic substitution reactions are produced from expensive starting fluoro monomers, and thus would be classed as expensive polymers.

These poly(aryl ether ketone)s exhibit an excellent combination of properties; i.e., thermal and hydrolytic stability, high strength and toughness, wear and abrasion resistance and solvent resistance. Thus, articles molded from poly(aryl ether ketone)s have utility where high performance is required. However, in some applications such as those where the poly(aryl ether ketone) is to be used as a thermoplastic composite matrix resin, its glass transition temperature (Tg) may not be as high as desired for the particular application. This is because polymers, even crystalline polymers, exhibit excessive loss of modulus, strength and creep resistance above their Tgs. This loss in properties may not be acceptable in cases where the materials are to be used as thermoplastic composite matrix resins.

Polyimides are a well known class of polymers. They are described by Cassidy, et al. in Kirk-Othmer, Encyclopedia of Chemical Technology, 3rd Ed., Vol. 18, pp. 704-719. C. Arnold, Jr., in the Journal of Polymer Science; Macromolecular Reviews, Vol. 14, pp. 265-378 (1979) devotes a portion of the article entitled: "Stability of High-Temperature Polymers", at pp. 322-333, to polyimides. They are also discussed by Elkin in Stanford Research Institute Report Number 86 (Menlo Park, Calif.) entitled "High Temperature Polymers" (1973). The physical and chemical characteristics of polyimides have been well documented.

In general, polyimides (especially aromatic polyimides) have excellent heat resistance but are difficult to process. According to P. E. Cassidy et al. (cited above), "wholly aromatic polyimide molding powders must be fabricated by sintering at high temperature and pressure". Injection molding and extrusion are thus not possible. J. M. Aducci in Polyimides, K. L. Mittal, Editor, 1984, published by Plenum Press, New York, states on page 1024:

"Polyimides, produced by the chemical reaction of an aromatic dianhydride and an aromatic diamine, were the first of the aromatic thermally stable polymers introduced in the mid-1950's. Polyimides did not behave as thermoplastics even though they had linear structures. Polymer backbones comprised of rigid, inherently stable, aromatic phenylene and imide rings imparted polyimides with excellent thermal oxidative properties and at the same time made them exceedingly difficult to process because of their high and sometimes indeterminate melting points."

According to T. P. Gannett et al., in U.S. Pat. No. 4,485,140, the polyimide of the structural formula:

by virtue of being more easily thermoformed and injection molded. For example, U.S. Pat. No. 4,293,670 to Robeson et al. discloses blends of polyarylether resins and polyetherimide resins having excellent mechanical compatibility and good impact strength and environmental stress crack resistance. U.S. patent application Ser. No. 537,042 filed on Sept. 29, 1983 in the name of J. E. Harris et al., assigned to the present assignee, describes blends of a select polyarylketone and a polyetherimide. U.S. patent application Ser. No. 626,105 filed on June 29, 1984 in the name of J. E. Harris et al., assigned to the present assignee, described blends of a polyamideimide and a poly(aryl ether ketone).

Japanese Patent Publications 59/184,254 (Oct. 19, 1984) and 84/187,054 (Oct. 24, 1984), both to Toray Co., Ltd., describe blends of poly(amide-imides), polyamides, and poly(ether-imides) with crystalline poly(aryl ether ketones). According to these publications, the poly(amide-imides) may contain up to 70 mole percent

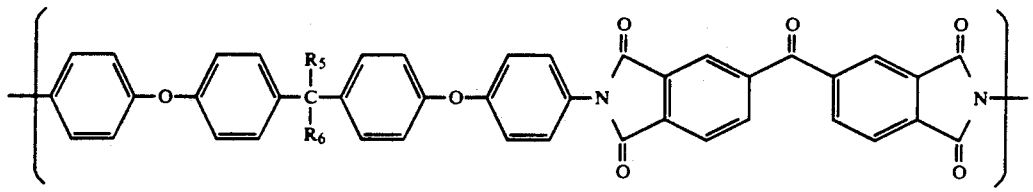

where $R_5$ and $R_6$ are $-CH_3$ or $-CF_3$, is typical of aromatic polyimides which are generally infusible. According to Alberino et al, U.S. Pat. No. 3,708,458, a polyimide having recurring units of the formula:

of a polyimide. The addition of the foregoing polymers to poly(aryl ether ketones) is stated to improve the heat deformation temperature as measured according to ASTM method D-648. It is obviously assumed that the

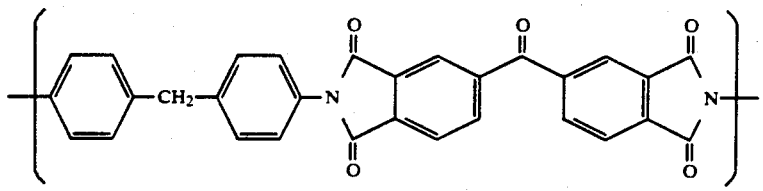

"possesses highly useful structural strength properties but . . . is difficult to mold, by compression at elevated temperatures, because of its relatively poor floor properties in the mold". The patentees developed a polyimide to overcome, to some extent, these difficulties by including in the polymer backbone a certain proportion of the reaction product of 3,3',4,4'-benzophenone tetracarboxylic dianhydride with 2,4- or 2,6-toluene diamine (or the corresponding diisocyanates). The copolymers were regarded as having better flow properties in the mold even though such difficult molding procedures as "sintering or hot processing" were the criteria used.

Thus, it can be said that aromatic polyimides in general do not lend themselves easily to melt fabrication except perhaps by compression molding.

Recently, the processability of polyimides has been improved by blending or alloying them with other resins which are themselves more easily melt processable resins in question have a Tg above 150° C., and preferably, above 170° C.

However, the Japanese publications do not cover any of the amide and/or imide-containing polymers of the instant invention. A possible miscibility and the resulting good properties of a blend of a poly(amide-imide) or a polyimide and of a poly(aryl ether ketone) must, therefore, be considered as purely speculative from the point of view of the above-mentioned publications.

Also, polyimides in general, do not necessarily improve the heat deformation point, or heat deflection (distortion) temperatures, as sometimes referred to, of poly(aryl ether ketones). For example, J. E. Harris et al. in U.S. patent application Ser. No. 716,401 filed on Mar. 27, 1985, assigned to the same assignee as this application, describe that a blend of 25 parts by weight of the polyimide of the formula:

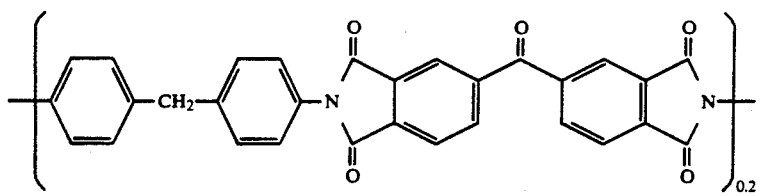

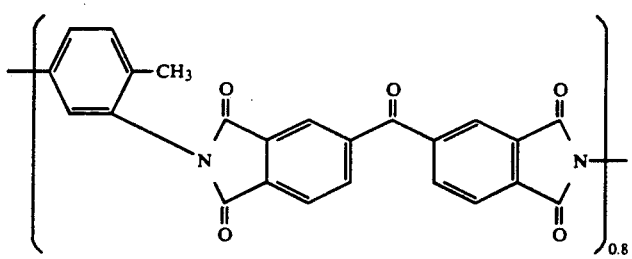

and 75 parts by weight of the poly(aryl ether ketone) of the formula:

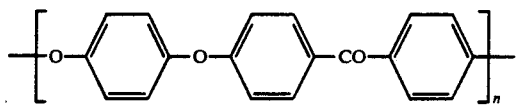

has a lower heat deflection temperature (151° C.) than the poly(aryl ether ketone) itself (160° C.), even though this polyimide clearly meets the criteria of the foregoing Japanese publication since its Tg of 317° C. is well above their preferred value of 170° C.

The polyimide blends with poly(aryl ether ketones) described in U.S. patent application Ser. No. 716,401 are different from the blends of the present invention; indeed the former blends are immiscible (two phase), while the imide-containing polymers of the present invention yield miscible blends with poly(aryl ether ketones). Miscibility is highly unexpected for a blend of two polymers and is generally not predictable.

In the field of miscibility or compatibility of polymer blends, the art has found predictability to be unattainable, even though considerable work on the matter has been done. According to authorities:

(A) "It is well known that compatible polymer blends are rare". Wang and Cooper, Journal of Polymer Science, Polymer Physics Edition, Vol. 21, p. 11 (1983).

(B) "Miscibility in polymer-polymer blends is a subject of widespread theoretical as well as practical interest currently. In the past decade or so, the number of blend systems that are known to be micsible has increased considerably. Moreover, a number of systems have been found that exhibit upper and lower critical solution temperatures, i.e., complete miscibility only in limited temperature ranges. Modern thermodynamic theories have had limited success to date in predicting miscibility behavior in detail. These limitations have spawned a degree of pessimism regarding the likelihood that any practical theory can be developed that can accommodate the real complexities that nature has bestowed on polymer-polymer interactions." Kambour, Bendler, Bopp, Macromolecules, 1983, 16, 753.

(C) "The vast majority of polymer pairs form two-phase blends after mixing as can be surmised from the small entropy of mixing for very large molecules. These blends are generally characterized by opacity, distinct thermal transitions, and poor mechanical properties. However, special precautions in the preparation of two-phase blends can yield composites with superior mechanical properties. These materials play a major role in the polymer industry, in several instances commanding a larger market than either of the pure components." Olabisi, Robeson, and Shaw, Polymer-Polymer Miscibility, 1979, published by Academic Press, New York, N.Y., p. 7.

(D) "It is well known that, regarding the mixing of thermoplastic polymers, incompatibility is the rule and miscibility and even partial miscibility is the exception. Since most thermoplastic polymers are immiscible in other thermoplastic polymers, the discovery of a homogeneous mixture or partially miscible mixture of two or more thermoplastic polymers is, indeed, inherently unpredictable with any degree of certainty; for example, see P. J. Flory, Principles of Polymer Chemistry, Cornell University Press, 1953, Chapter 13, p. 555." Younes, U.S. Pat. No. 4,371,672.

(E) "The study of polymer blends has assumed an ever increasing importance in recent years and the resulting research effort has led to the discovery of a number of miscible polymer combinations. Complete miscibility is an unusual property in binary polymer mixtures which normally tend to form phase-separated systems. Much of the work has been of a qualitative nature, however, and variables such as molecular weight and conditions of blend preparation have often been overlooked. The criteria for establishing miscibility are also varied and may not always all be applicable to particular systems." Saeki, Cowie and McEwen, Polymer, 1983, vol. 25, January, p. 60.

Thus, miscible polymer blends are not common. The criteria for determining whether or not two polymers are miscible are now well established. According to Olabisi, et al., Polymer-Polymer Miscibility, 1979, published by Academic Press, New York, N.Y., p. 120.

"The most commonly used method for establishing miscibility in polymer-polymer blends or partial phase mixing in such blends is through determination of the glass transition (or transitions) in the blend versus those of the unblended constituents. A miscible polymer blend will exhibit a single glass transition between the Tg's of the components with a sharpness of the transition similar to that of the components. In cases of borderline miscibility, broadening of the transition will occur. With cases of limited miscibility, two separate transitions between those of the constituents may result, depicting a component 1-rich phase and a component 2-rich phase. In cases where strong specific interactions occur, the Tg may go through a maximum as a function of concentration. The basic limitation of the utility of glass transition determinations in ascertaining polymer-polymer miscibility exists with blends composed of components which have equal or similar (<20° C. difference) Tg's, whereby resolution by the techniques to be discussed of two Tg's is not possible."

W. J. MacKnight et al., in *Polymer Blends*, D. R. Paul and S. Newman, eds, 1978, published by Academic Press, New York, N.Y., state on page 188:

"Perhaps the most unambiguous criterion of polymer compatibility is the detection of a single glass transition whose temperature is intermediate between those corresponding to the two component polymers."

In this passage, it is clear from the omitted text that by compatibility the authors mean miscibility, i.e., single phase behavior. See, for example, the discussion in Chapter 1 by D. R. Paul in the same work.

THE INVENTION

It has now been found that blends of poly(aryl ether ketone)s and select poly(amide-imides) and polyimides are very compatible; in fact, they tend to form one phase in the amorphous state, and thus are miscible systems. As a result, such blends can significantly improve the processability of the poly(amide-imide) and/or polyimide. Further, by increasing its Tg, the ultimate use temperature of the poly(aryl ether ketone) is significantly increased.

Due to the miscibility of these blends, injection molded samples of the blends are transparent even though the poly(aryl ether ketone) is opaque under normal injection molding conditions. However, with proper annealing, opacity due to crystallization of the poly(aryl ether ketone) can be accomplished.

The blends of poly(amide-imides) or polyimides and poly(aryl ether ketone)s may be used in a number of diverse high performance applications. Poly(amide-imide) or polyimide modifications of the poly(aryl ether ketone) may be used in composites containing carbon or other fiber where improved stiffness at 350° F. is required. There is a specific temperature requirement for certain composite applications, and the increased Tg of the poly(aryl ether ketone) with the imide containing polymer improves this deficiency especially for poly(aryl ether ketone)s having low Tg's.

Further, the addition of the poly(aryl ether ketone) to the imide-containing polymer results in an enhancement in toughness. The blends exhibit toughness which often exceed that of either constituent.

Addition of the poly(amide-imide) or polyimide to the crystalline poly(aryl ether ketone) results in a blend which has reduced mold shrinkage and increased dimensional stability as compared to the poly(aryl ether ketone) per se.

The blends of this invention comprise
(a) at least one poly(aryl ether ketone), and
(b) at least one poly(amid-imide), or polyimide which contains isoalkylidene preferably isopropylidene bridges and which is derived from at least one polycarboxylic acid or derivative thereof having the formula:

$$R(COOH)n \qquad (9)$$

and from at least one diamine having the formula:

$$H_2N-Ar-NH_2 \qquad (10)$$

In the formulae above, n can be 3 or 4; R is a tri-, or tetravalent aromatic radical, preferably

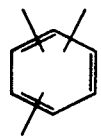

or the corresponding radicals derived from naphthalene, and

where X is a chemical bond, O, S, SO, SO$_2$,

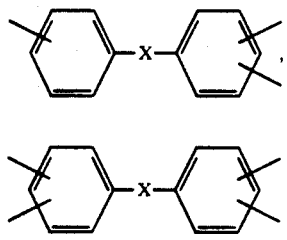

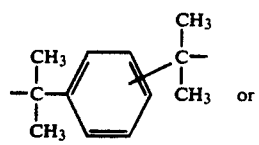

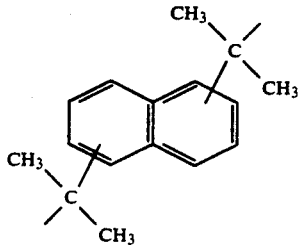

and isomers thereof. Ar is the radical

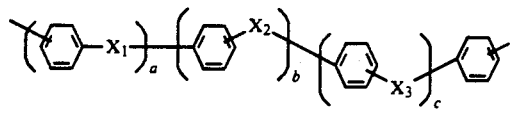

and/or the radical

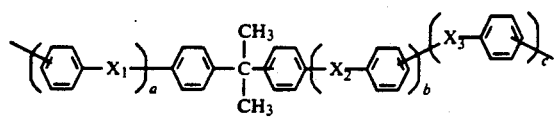

wherein a, b, and c are independently 0 and 1, and wherein $X_1$, $X_2$ and $X_3$ may independently take on the same values as X.

Within the scope of this invention, preferred polyimides are represented by the formula

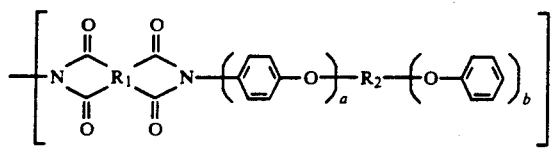

wherein $R_1 =$

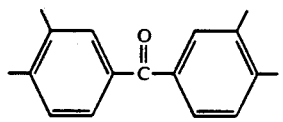

and $R_2 =$

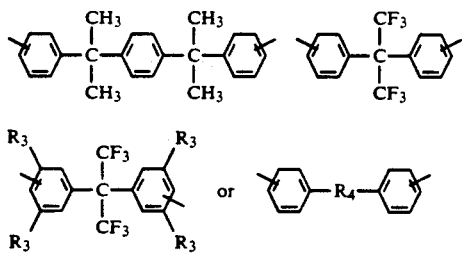

and a and b are 0 or 1 and may be the same or different, $R_3$ is a $C_1$ to $C_5$ alkyl radical, and $R_4$ is a divalent, saturated or unsaturated aliphatic hydrocarbon radical, particularly an alkylene or alkylidene radical having 1 to 3 carbon atoms or a cycloalkylidene or cycloalkylene radical having up to and including 9 carbon atoms, and/or at least one thermoformable poly imide made from the following dianhydride:

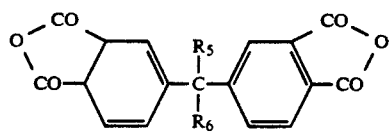

where $R_5$ and $R_6$ are $CF_3$ or $CH_3$ and may be the same or different.

The imide containing polymers can be homopolymers, random copolymers, and block copolymers. The instant invention is thus directed to blends of a poly(aryl ether ketone) with an aromatic poly(amide-imide) or an aromatic polyimide. Moreover, according to the instant invention, the polyimide or polyamide-imide should contain at least 3% by weight, and preferably 7% by weight of isoalkylidene, preferably isopropylidene bridges.

It should be noted that the imide containing polymers may be based on more than one diamine and/or on more than one polycarboxylic acid.

The polymers are prepared by methods well known in the art. The preparation of the imide-containing materials is set forth, for example in U.S. Pat. Nos. 3,208,458; 3,652,409; 3,179,634; 3,972,902; 3,355,427; 4,485,140; and 4,111,906. The polyimides may be prepared, for example, by reacting, at temperatures ranging from ambient to about 175° C., an organic diamine with a tetracarboxylic acid dianhydride. Alternatively, a tetracarboxylic acid dianhydride can be reacted with a diisocyanate, in place of the diamine. Reaction of an isocyanate with the anhydride group yields a seven membered cyclic intermediate which spontaneously collapses to form the imide with evolution of carbon dioxide. Similar reactions are used for the preparation of the poly(amide-imides) except that a tricarboxylic acid monoanhydride or derivative thereof is used instead of the tetracarboxylic acid dianhydride.

In addition to the reaction of a diamine with a tricarboxylic acid monoanhydride or derivative thereof, the poly(amide-imides) of the instant invention may also be prepared via the routes shown in equations (I)–(IV). The chemistry of these routes is the same as that described above for the preparation of polyamides, poly(amide-imides), and polyimides. Note that the terms dicarboxylic acid, tricarboxylic acid monoahydride, and diamine are meant to include appropriately reactive derivatives thereof as required for the polymerizations. Thus, the term dicarboxylic acid includes also the corresponding acid chloride; the term diamine includes also the corresponding di-N-acylated derative; these latter materials were shown to be very useful for the preparation of poly(amide-imides) . . . see Keske, Polymer Preprints, Vol. 25, No. 2, p. 12 (1984).

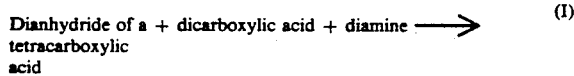

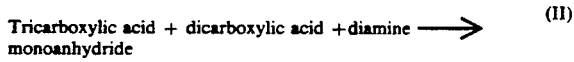

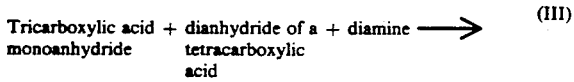

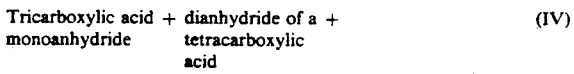

The materials useful in equations (I)-(IV) are $R(COOH)_n$ and $H_2N\ Ar\ NH_2$ wherein R, Ar, and n are as defined above. An additional reactant is the dicarboxylic acid $R'(COOH)_2$ where R' is

and where X is as defined above. As indicated before, imide containing polymers which show the unusual and unexpected ability to form compatible blends with poly(aryl) ether ketone)s are based on monomers that posess isopropylidene bridges within their molecules. At least one of the reactants, i.e., either the polycarboxylic acid or the diamine must contain a group:

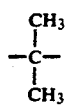

Note that in addition to $R(COOH)_n$, $R'(COOH)_2$ and $H_2N\ Ar\ NH_2$ as defined above, the reactants may comprise up to 50 mole percent, preferably up to 25 mole percent, and most preferably not more than about 15 mole percent of other polycarboxylic acid and/or diamine components, such as pyromellitic dianhydride, for example.

As indicated above, the amide- and imide-based polymers that are useful in the instant invention are prepared from monomers that contain isoalkylidene, preferably isopropylidene bridges. The starting materials for the preparation of these monomers are typically the derivatives (11) or preferably (12).

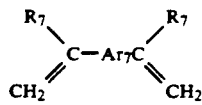 (11)

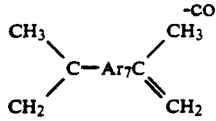 (12)

In the formulae above, $R_7$ is an alkyl group having from 1 to 10 carbon atoms and is preferably methyl; $Ar_7$ is

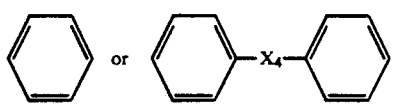

where $X_4$ is a chemical bond, O, SO, SO2,

CH2, or an alkylidene group having from 2 to 8 carbon atoms; or

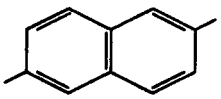

or isomers thereof.

The acid-catalyzed condensation of (11) or of (12) with aniline leads to the desired diamino monomers. Friedel-Crafts reaction of (11) or of (12) with e.g., o-xylene, followed by oxidation and dehydration yields dianhydrides containing isoalkylidene or isopropylidene bridges. Similar approaches can be used to prepare the tricarboxylic acid monoanhydrides having isoalkylidene or isopropylidene groups within their molecules.

The crystalline poly(aryl ether ketone)s which are suitable for use herein can be generically characterized as containing repeating units of one or more of the following formulae:

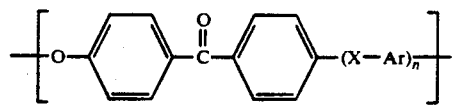

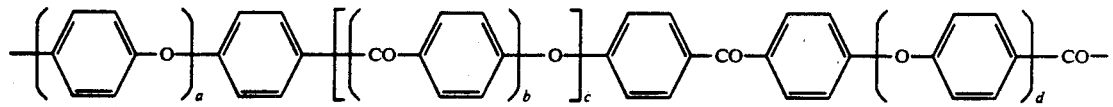

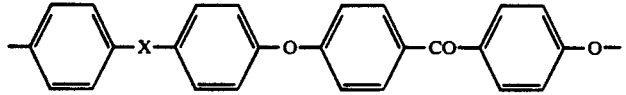

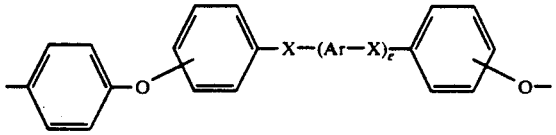

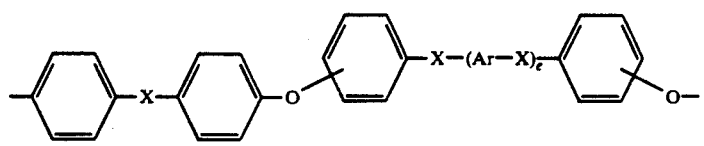
wherein Ar is independently a divalent aromatic radical selected from phenylene, biphenylene or naphthylene, X is independently O,
or a direct bond and n is an integer of from 0 to 3, b, c, d and e are 0 to 1 and a is an integer of 1 to 4 and preferably d is 0 when b is 1.
Preferred poly(aryl ether ketone)s include those having repeating units of the formula:
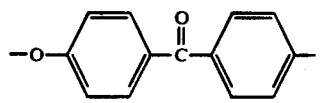
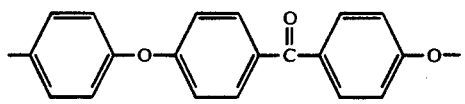
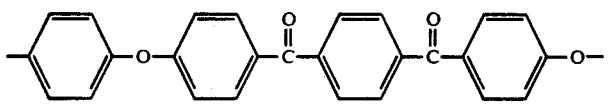
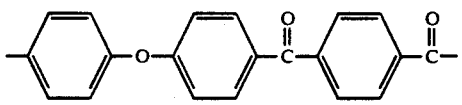
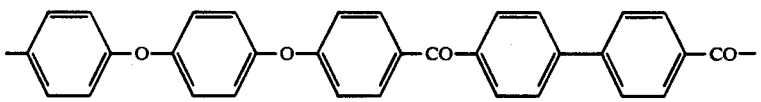
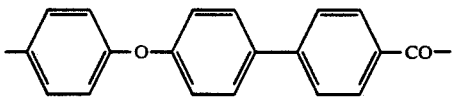
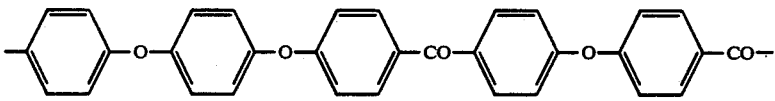
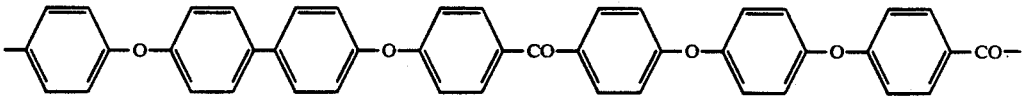
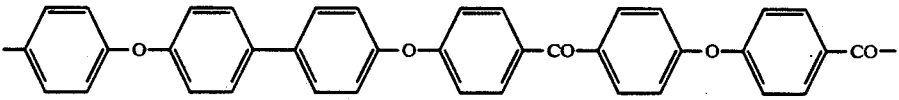
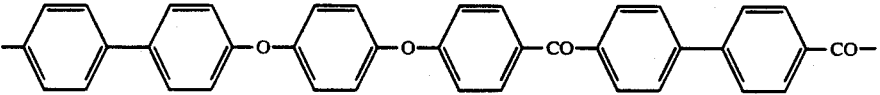

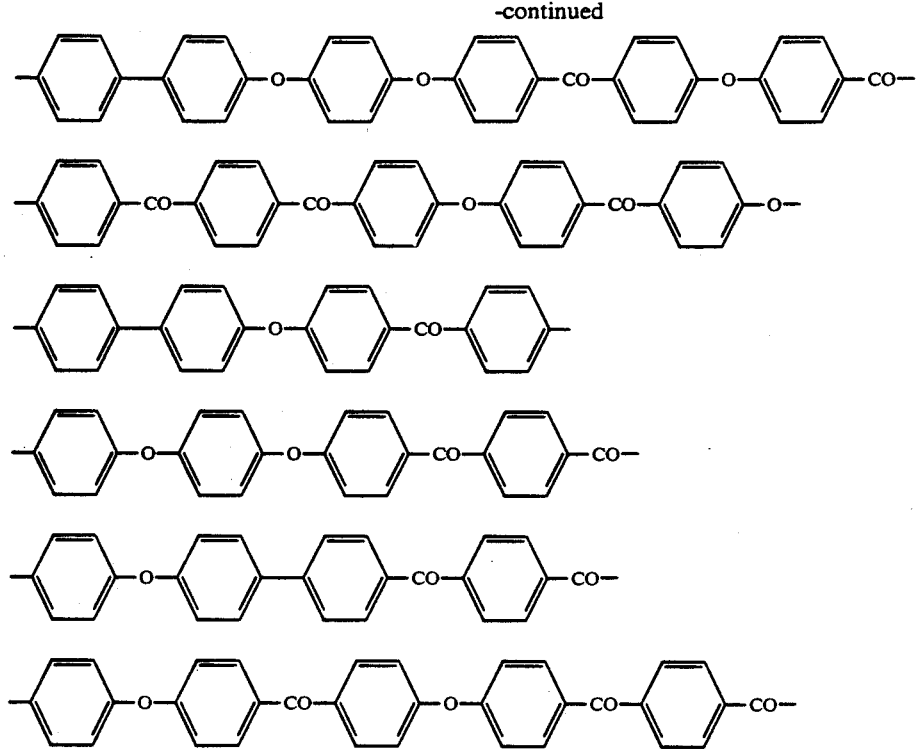

These poly(aryl ketone)s are prepared by methods well known in the art. One such method comprises heating a substantially equimolar mixture of at least one bisphenol and at least one dihalobenzoid compound or at least one halophenol compound. Preferred bisphenols in such a process include:
hydroquinone,
4,4'-dihydroxybenzophenone,
4,4'-dihydroxybiphenyl, and
4,4'-dihydroxydiphenyl ether.

Preferred halophenol and dihalobenzoid compounds include:
4-(4'-chlorobenzoyl)phenol,
4-(4'-fluorobenzoyl)phenol,
4,4'-difluorobenzophenone,
4,4'-dichlorobenzophenone,
4-chloro-4'-fluorobenzophenone,

and

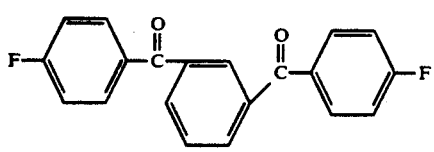

The poly(aryl ether ketone)s may be produced by the process as described in, for example, U.S. Pat. No. 4,176,222. This process comprises heating in the temperature range of 100° to 400° C., (i) a substantially equimolar mixture of (a) at least one bisphenol and (b) at least one dihalobenzoid compound, and/or (ii) at least one halophenol, in which in the dihalobenzoid compound or halophenol, the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.2 gram atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide.

Also, poly(aryl ether ketone)s such as those containing repeating units of the formula:

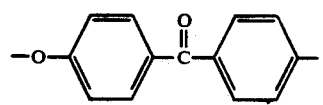

may be produced by Friedel-Craft reactions utilizing hydrogen fluoride-boron trifluoride catalysts as described, for example, in U.S. Pat. No. 3,953,400.

Additionally, poly(aryl ether ketones) of the following formula:

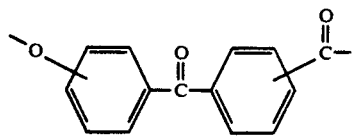

may be prepared by Friedel-Craft reactions using a boron fluoride-hydrogen fluoride catalyst as described in, for example, U.S. Pat. Nos. 3,441,538; 3,442,857 and 3,516,966.

The polyketones may also be prepared according to the process as described in, for example, U.S. Defensive Publication T 103,703 and U.S. Pat. No. 4,396,755. In such processes, reactants such as (a) an aromatic monocarboxylic acid, (b) a mixture of at least one aromatic dicarboxylic acid, and an aromatic hydrocarbon, and (c) combinations of (a) and (b) are reacted in the presence of a fluoroalkane sulphonic acid, particularly trifluoromethane sulphonic acid.

Additionally, poly(aryl ketone)s of the following formulas:

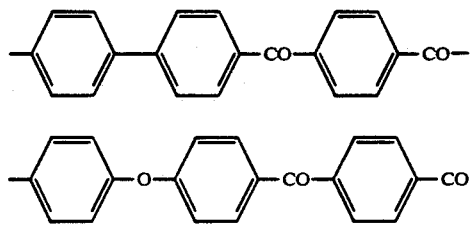

may be prepared according to the process as described in, for example, U.S. Pat. No. 4,398,020. In such a process, (a) a mixture of substantially equimolar amounts of
(i) at least one aromatic diacyl halide of the formula:

where —Ar— is a divalent aromatic radical, Y is halogen and COY is an aromatically bound acyl halide group, which diacyl halide is polymerizable with at least one aromatic compound of (a)(ii), and (ii) at least one aromatic compound of the formula:

wherein —Ar'— is a divalent aromatic radical and H is an aromatically bound hydrogen atom, which compound is polymerizable with at lease one diacyl halide of (a)(i), or (b) at least one aromatic monoacyl halide of the formula:

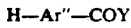

where —Ar"— is a divalent aromatic radical, H is an aromatically bound hydrogen atom, and Y and COY are as defined above, which monoacyl halide is self-polymerizable, or (c) a combination of (a) and (b) are reacted in the presence of a fluoroalkane sulphonic acid.

The term poly(aryl ether ketone) as used herein is meant to include homopolymers, copolymers, terpolymers, graft copolymers, and the like.

The poly(aryl ether ketone)s have a reduced viscosity of at least about 0.4 to about 5.0 dl/g, as measured in concentrated sulphuric acid at 25° C.

The poly(aryl ether ketone)s and the imide containing polymers are each used in the blend in amounts of from about 2 to about 98, preferably from about 20 to about 80 weight percent.

The blends of this invention may include mineral fillers such as carbonates including chalk, calcite and dolomite; silicates including mica, talc, wollastonite, silicon dioxide; glass spheres; glass powders; aluminum; clay; quartz; and the like. Also, reinforcing fibers such as fiberglass, carbon fibers, and the like may be used. The blend may also include additives such as titanium dioxide; thermal stabilizers, ultraviolet light stabilizers, plasticizers, and the like.

The blends of this invention may be fabricated into any desired shape, i.e., moldings, coatings, films, or fibers. They are particularly desirable for use as electrical insulation for electrical conductors.

EXAMPLES

The following examples serve to give specific illustrations of the practice of this invention but they are not intended in any way to limit the scope of this invention.

The designations used in the following examples have the meanings described in Table I.

PREPARATION OF THE IMIDE-CONTAINING POLYMERS

Method A

To a 500 ml round bottom flask, fitted with a thermometer and mechanical stirrer, was added (0.050 moles) of the diamine or mixture of diamines and 100 g of dimethylacetamide. The solution was stirred and cooled in an ice bath to 10°-15° C. Following addition of 0.050 moles of the dianhydride and 10.0 g of dimethylacetamide, the amber colored solution was stirred for three hours at 20°-23° C. The solution was then diluted with 200 ml of dimethylacetamide. Imidization was accomplished by adding 0.15 moles of acetic anhydride to the solution and stirring overnight at room temperature. The following day, the contents of the flask were coagulated in deionized water, rinsed twice with acetone and dried in a vacuum oven at 80° C.

Method B 0.040 moles of diamine, 0.039 moles of dianhydride and 0.002 moles of phthalic anhydride (end capper) were dry mixed thoroughly as powders at room temperature. This powder mixture was added to a Brabender mixer equipped with a 30 g mixing bowl. The bowl had been preheated to 350° C. The powder was added as quickly as possible and fluxed for about five minutes. The resulting melt polymerized polyimide was then compression molded and tested.

Method C

A 0.05 mole quantity of the aromatic diamine was placed in a 500 ml round bottomed flask containing 120 g of N,N-dimethylacetamide (DMAC). Upon dissolving, the solution was cooled to 0° C. and 0.05 moles of the tricarboxylic anhydride acid chloride were added. The solution was allowed to come to room temperature while being stirred at which point 0.15 moles of pyridine were added. The yellow color solution was stirred for two hours and then treated with 120 g DMAC, an additional 0.15 moles of pyridine and 0.30 moles of acetic anhydride. The solution was heated for one hour at 90°-100° C. The resulting solution or semi-solid was coagulated in two liters of methanol. The resulting fluff was collected and reslurried in two liters of fresh methanol. Following collection of this fluff by filtration, the polymer was dried in a vacuum oven at 90° C. for 16 hours.

Method D

A three-liter three-necked flask equipped with a stirrer, Dean Stark trap, thermometer and heating mantle is purged with nitrogen. A solution of 0.100 moles of the diamine in about 575 g of m-cresol is added and stirred for 10 minutes. 0.099 moles of the dianhdride, 0.003 moles of phthelic anhydride, 0.1 grams of p-toluene sulfonic acid, and 250 grams of xylene are now charged and the mixture is stirred for about 30 minutes. The mixture is then heated to reflux (156° C.) over a two-hour period and refluxed for 4 hours. The reaction mixture is cooled, precipitated in methanol, filtered and reslurried in methanol. The slurry is boiled for 8 hours, filtered and dried in a vacuum oven at 90° C. for 16 hours.

EXAMPLES OF BLENDS

Control A

Polyimide I was compression molded in a 4×4×0.020 inch cavity mold at about 380° C. in a South Bend hydraulic press. The sample was cooled while in the press by passing water through cooling channels within the platens. Cooling from 380° C. to room temperature took about 10 minutes. One-eight inch strips were shear cut from the molded product. These strips were tested for 1% secant modulus according to a procedure similar to ASTM D-638, tensile strength and elongation at break according to ASTM D-638, and pendulum impact strength. [Pendulum impact strength is measured as follows: A steel pendulum is used, cylindrical in shape with a diameter of 0.83 inch and weighing 1.562 pounds; the striking piece, mounted almost at the top of the pendulum, is a cylinder 0.3 inch in diameter; film specimens, 4 inches long, 0.125 inch wide and about 1 to 30 mils thick, are clamped between the jaws of the tester so that the jaws are spaced 1 inch apart; the 0.125 inch width of the film is mounted vertically; the pendulum is raised to a constant height to deliver 1.13 foot pounds at the specimen; when the pendulum is released the cylindrical striking piece hits the specimen with its flat end, breaks the film, and travels to a measured height beyond; the difference in the recovery height (i.e., the difference in the potential energy of the pendulum at the maximum point of the upswing), represents the energy absorbed by the specimen during the rupture; the impact strength, expressed in foot-pounds per cubic inch, is obtained by dividing the pendulum energy loss by the volume of the specimen.] The results are shown in Table III.

The glass transition temperature of the molded plaque was measured by two methods. The modulus-resilience method described by Olabisi, et al., in Polymer-Polymer Miscibility, Academic Press, N.Y., p. 126, was used to determine the Tg of the as-molded plaque at a heating rate of 1.6° C./minute. The Tg of Control A was also determined by placing it in an aluminum DSC pan and heating it to 400° C. for one minute in the barrel of a Tinius-Olsen Extrusion Plastometer. The sample was then quenched rapidly to room temperature by bringing it in contact with a large metal block. The quenching process took 1-2 seconds. The sample was then placed in a DuPont 1090 thermal analyzer equipped with a dual DSC sample cell and the Tg determined by methods well known in the field of polymer science, by heating at 10° K./minute. The results are shown in Table IV.

After drying to remove absorbed moisture, a sample of the compression molded plaque was placed in the barrel of a Tinius-Olsen Extrusion Plastometer and the melt index determined according to ASTM D-1238 at 380° C. using a 21660 gram weight. The melt index was reported in the units of grams of polymer extrudate in a 10-minute period after preheating for 10 minutes in the plastometer. The results are given in Table V.

Control B

Polyimide II was compression molded in a 4×4×0.02 inch cavity mold at about 380° C. in a South Bend hydraulic press. The sample was cooled while in the press by passing water through cooling channels within the platens. The molded plaque was tested as in Control A and the results are given in Tables III, IV and V.

Control C

Polyimide III was compression molded in a 4×4×0.02 inch cavity mold at about 400° C. in a South Bend hydraulic Press. The sample was cooled while in the press by passing water through cooling channels within the platens. The molded plaque was tested for mechanical properties and Tg as in Control A and the results are given in Tables III and IV.

Control D

Polyimide IV is compression molded in a 4×4×0.02 inch cavity mold at about 400° C. in a South Bend hydraulic Press. The sample is cooled while in the press by passing water through cooling channels within the platens. The molded plaque is tested for mechanical properties and Tg as in Control A and the results are given in Tables III and IV.

Control E

Polyimide V was compression molded in a 4×4×0.02 inch cavity mold at about 400° C. in a South Bend hydraulic Press. The sample was cooled while in the press by passing water through cooling channels within the platens. The molded plaque was tested for mechanical properties and Tg as in Control A and the results are given in Tables III and IV.

Control F

Poly(aryl ether ketone) I was compression molded in a 4×4×0.02 inch cavity mold at about 380° C. in a South Bend hydraulic Press. The sample was cooled while in the press by passing water through cooling channels within the platens. The molded plaque was tested as in Control A and the results are given in Tables III and IV and V.

Control G

Poly(aryl ether ketone) II was compression molded in a 4×4×0.02 inch cavity mold at about 400° C. in a South Bend hydraulic Press. The sample was cooled while in the press by passing water through cooling channels within the platens. The molded plaque was tested for mechanical properties as in Control A and the results are given in Tables III and IV.

Control H

Poly(aryl ether ketone) III was compression molded in a 4×4×0.02 inch cavity mold at about 400° C. in a South Bend hydraulic Press. The sample was cooled while in the press by passing water through cooling channels within the platens. The molded plaque was tested for mechanical properties and Tg as in Control A and the results are given in Tables III and IV.

EXAMPLE I 50 parts by weight of Polyimide I and 50 parts by weight of Poly(aryl ether ketone) I were melt blended in a Brabender Plasticorder mixer at about 380° C. The blend was then compression molded in a 4×4×0.020 inch cavity mold at about 380° C. in a South Bend hydraulic press. The blend was cooled while in the press by passing water through cooling channels within the platens. The molded blend was tested as in Control A and the results are given in Tables III, IV and V.

EXAMPLE II 50 parts by weight of Polyimide II and 50 parts by weight of Poly(aryl ether ketone) II were melt blended in a Brabender Plasticorder mixer at about 400° C. The blend was then compression molded in a 4×4×0.020 inch cavity mold at about 400° C. in a South Bend hydraulic press. The blend was cooled while in the press by passing water through cooling channels within the platens. The molded blend was tested as in Control A and the results are given in Tables III, IV and V.

EXAMPLE III 40 parts by weight of Polyimide III and 60 parts by weight of Poly(aryl ether ketone) I were melt blended in a Brabender Plasticorder mixer at about 400° C. The blend was then compression molded in a 4×4×0.020 inch cavity mold at about 400° C. in a South Bend hydraulic press. The blend was cooled while in the press by passing water through cooling channels within the platens. The molded blend was tested for mechanical properties and Tg as in Control A and the results are given in Tables III and IV.

EXAMPLE IV 50 parts by weight of Polyimide IV and 50 parts by weight of Poly(aryl ether ketone) I are melt blended in a Brabender Plasticorder mixer at about 400° C. The blend is then compression molded in a 4×4×0.020 inch cavity mold at about 400° C. in a South Bend hydraulic press. The blend is cooled while in the press by passing water through cooling channels within the platens. The molded blend is tested for mechanical properties and Tg as in Control A and the results are given in Tables III and IV.

EXAMPLE V 50 parts by weight of Polyimide V and 50 parts by weight of Poly(aryl ether ketone) III were melt blended in a Brabender Plasticorder mixer at about 400° C. The blend was then compression molded in a 4×4×0.020 inch cavity mold at about 400° C. in a South Bend hydraulic press. The blend was cooled while in the press by passing water through cooling channels within the platens. The molded blend was tested for mechanical properties and Tg as in Control A and the results are given in Tables III and IV.

TABLE V

Melt Index Data of Polyimide/Poly(aryl ether ketone) Blends at 380° C.

| Example | Description of the Composition | Melt Index After 10 Minute Preheat |
|---|---|---|
| Control A | PI I | 0 (no flow) |
| Example I | 50% PI I 50% PAEK I | 0.022 |
| Control F | PAEK I | 98 |
| Control B | PI II | 0.115 |
| Example II | 50% PI II 50% PAEK II | 0.130 |
| Control G | PAEK II | 31 |

PI = polyimide; PAEK = poly(aryl ether ketone).

Control I

Polyimide VI was compression molded in a 4×4×0.02 inch cavity mold at about 380° C. in a South Bend hydraulic press. The sample was cooled while in the press by passing water through cooling channels within the platens. The molded plaque was tested as in Control A and the results are given in Table VI.

EXAMPLE VI 50 parts by weight of Polyimide VI and 50 parts by weight of Poly(aryl ether ketone) I were blended in a Brabender Plasticorder mixer at about 380° C. The blend was then compression molded in a 4×4×0.020 inch cavity mold at about 375° C. in a South Bend hydraulic press. The blend was cooled while in the press by passing water through cooling channels within the platens. The molded blend was tested as in Control A and the results are given in Table VI.

Control J

Polyimide VII is compression molded in a 4×4×0.02 inch cavity mold at about 380° C. in a South Bend hydraulic press. The sample is cooled while in the press by passing water through cooling channels within the platens. The molded plaque is tested for mechanical properties and Tg as in Control A and the results are given in Table VI.

EXAMPLE VII 50 parts by weight of Polyimide VII and 50 parts by weight of Poly(aryl ether ketone) I are melt blended in a Brabender Plasticorder mixer at about 380° C. The blend is then compression molded in a 4×4×0.020 inch cavity mold at about 380° C. in a South Bend hydraulic press. The blend is cooled while in the press by passing water through cooling channels within the platens. The molded blend is tested as in Control A and the results are given in Table VI.

Control K

Polyimide VIII is compression molded in a 4×4×0.02 inch cavity mold at about 400° C. in a South Bend hydraulic press. The sample is cooled while in the press by passing water through cooling channels within the platens. The molded plaque is tested as in Control A and the results are given in Table VI.

EXAMPLE VIII 50 parts by weight of Polyimide VIII and 50 parts by weight of Poly(aryl ether ketone) I are melt blended in a Brabender Plasticorder mixer at about 400° C. The blend is then compression molded in a 4×4×0.020 inch cavity mold at about 400° C. in a South Bend hydraulic press. The blend is cooled while in the press by passing water through cooling channels within the platens. The molded blend is tested as in Control A and the results are given in Table VI.

Control L

Polyimide IX was compression molded in a 4×4×0.02 inch cavity mold at about 360° C. in a South Bend hydraulic press. The sample was cooled while in the press by passing water through cooling channels within the platens. The molded plaque was tested for mechanical properties and Tg as in Control A and the results are given in Table VI.

EXAMPLE IX 40 parts by weight of Polyimide IX and 60 parts by weight of Poly(aryl ether ketone) I were blended in a Brabender plasticorder mixer at about 360° C. The blend was then compression molded in a 4×4×0.020 inch cavity mold at about 360° C. in a South Bend hydraulic press. The blend was cooled while in the press by passing water through cooling channels within the platens. The molded blend was tested as in Control A and the results are given in Table VI.

Control M

Polyimide X is compression molded in a 4×4×0.02 inch cavity mold at about 380° C. in a South Bend hydraulic press. The sample is cooled while in the press by passing water through cooling channels within the platens. The molded plaque is tested as in Control A and the results are given in Table VI.

EXAMPLE X 50 parts by weight of Polyimide X and 50 parts by weight of Poly(aryl ether ketone) I are melt blended in a Brabender Plasticorder mixer at about 360° C. The blend is then compression molded in a 4×4×0.020 inch cavity mold at about 380° C. in a South Bend hydraulic press. The blend is cooled while in the press by passing water through cooling channels within the platens. The molded blend is tested as in Control A and the results are given in Table VI.

Control N

Poly(amide-imide) I was compression molded in a 4×4×0.02 inch cavity mold at about 380° C. in a South Bend hydraulic press. The sample was cooled while in the press by passing water through cooling channels within the platens. The molded plaque was tested for mechanical properties and Tg as in Control A and the results are given in Table VII.

EXAMPLE XI 50 parts by weight of Poly(amide-imide) I and 50 parts by weight of Poly(aryl ether ketone) I were melt blended in a Brabender Plasticorder mixer at about 380° C. The blend was then compression molded in a 4×4×0.020 inch cavity mold at about 380° C. in a South Bend hydraulic press. The blend was cooled while in the press by passing water through cooling channels within the platens. The molded blend was tested as in Control A and the results are given in Table VII.

Control O

Poly(amide-imide) II was compression molded in a 4×4×0.02 inch cavity mold at about 380° C. in a South Bend hydraulic press. The sample was cooled while in the press by passing water through cooling channels within the platens. The molded plaque was tested as in Control A and the results are given in Table VII.

EXAMPLE XII 50 parts by weight of Poly(amide-imide) II and 50 parts by weight of Poly(aryl ether ketone) I were melt blended in a Brabender Plasticorder mixer at about 380° C. The blend was then compression molded in a 4×4×0.020 inch cavity mold at about 380° C. in a South Bend hydraulic press. The blend was cooled while in the press by passing water through cooling channels within the platens. The molded blend was tested as in Control A and the results are given in Table VII.

Control D

Poly(amide-imide) III was compression molded in a 4×4×0.02 inch cavity mold at about 360° C. in a South Bend hydraulic press. The sample was cooled while in the press by passing water through cooling channels within the platens. The molded plaque was tested for mechanical properties as in Control A and the results are given in Table VII.

EXAMPLE XIII 40 parts by weight of Poly(amide-imide) III and 60 parts by weight of Poly(aryl ether ketone) I were melt blended in a Brabender Plasticorder mixer at about 360° C. The blend was then compression molded in a 4×4×0.020 inch cavity mold at about 360° C. in a South Bend hydraulic press. The blend was cooled while in the press by passing water through cooling channels within the platens. The molded blend was tested as in Control A and the results are given in Table VII.

In the previous examples all of the polyimides and poly(amid-imides) gave miscible blends with the Poly(aryl ether ketone)s. All of the blends had a single glass transition temperature, intermediate between those of the constituents. Furthermore, the blends were amorphous as compression molded since the crystallization rates of the Poly(aryl ether ketone)s were significantly reduced. As a result of being amorphous, the blends were transparent*. This is a common occurence in miscible blends when the higher Tg component is an amorphous polymer and the lower Tg component is semi-crystalline. The higher Tg of the blend combined with the melting point depression of the crystalline component significantly reduces the crystallization rate.

*The product of Example II was not transparent because the poly(aryl ether ketone) II was used as received, and contained 3% TiO₂ and 1% of —Al₂O₃ to improve its thermal stability.

In all the previous examples of miscible blends, the polyimides and poly(amide-imides) contained isoalkylidene (isopropylidene) linkages. The following examples will demonstrate that polyimides and poly(amide-imides) that do not contain this linkage are generally not miscible with poly(aryl ether ketones).

Controls Q, R, S, T and U

The Tgs of Polyimides XI, XII and XIII, and Poly(amide-imides) IV and V were determined by DSC or the mechanical (modulus-resilience) method as described in Control A. The results are given in Table VIII.

EXAMPLES XIV, XV, XVI, XVII and XVIII

Blends of Polyimides XI, XII and XIII, and Poly(amide-imides) IV and V were made with poly(aryl ether ketone)s I and II in a Brabender at about 360°-380° C. The compositions were as shown in Table VIII. The blends were compression molded into 4×4×0.020 inch plaques at about 360°-400° C. in a South Bend hydraulic press in a cavity mold. The Tgs of the blends were determined by DSC or the mechanical (modulus-resilience) method as described in Control A. The results are given in Table VIII.

The products of examples XVI, XVII and XVIII clearly have two Tgs as determined by DSC; these represent the poly(aryl ether ketone) I phase (lower Tg) and the polyimide or poly(amide-imide) phase (upper Tg). The upper Tg attributable to the polyimide phase in Examples XIV and XV is partially obscured by the melting behavior of the poly(aryl ether ketone). However, it is still detectable. In addition, the lower Tg, attributable to the poly(aryl ether ketone) phase, is within experimental error of that measured for the poly(aryl ether ketone) itself. If a substantial amount of polyimide were mixed in into the poly(aryl ether ketone) phase, its Tg would have risen detectably. Based upon these observations, the blends of examples XIV and XV are considered immiscible.

TABLE I

Designations of the Polymers Used in the Experimental Examples

| Designation | Structure | R.V. (dl/g) |
|---|---|---|
| Polyimide I | [structure] | 0.21[a]<br>Source: Prepared by Method A from Dianhydride I and Diamine I |
| Polyimide II | [structure] | 0.30[a]<br>Source: Prepared by Method A from Dianhydride I and Diamine II |
| Polyimide III | [structure] | 0.16[a]<br>Source: Prepared by Method A from Dianhydride I and a mixture of Diamines I and III |
| Polyimide IV | [structure] | 0.5[a]<br>Source: Prepared by Method D from Dianhydride II and Diamine IV |

TABLE I-continued

Designations of the Polymers Used in the Experimental Examples

| Designation | Structure | R.V. (dl/g) |
| --- | --- | --- |
| Polyimide V | (structure shown) | 0.25[a]<br>Source: Prepared by Method A from Dianhydride I and a mixture of Diamines II and III |
| Polyimide VI | (structure shown) | 0.45[b]<br>Source: Prepared by Method A from Dianhydride II and Diamine I |
| Polyimide VII | (structure shown) | 0.5[a]<br>Source: Prepared by Method D from Dianhydride III and Diamine III |

TABLE I-continued

Designations of the Polymers Used in the Experimental Examples

| Designation | Structure | R.V. (dl/g) |
|---|---|---|
| Polyimide VIII | 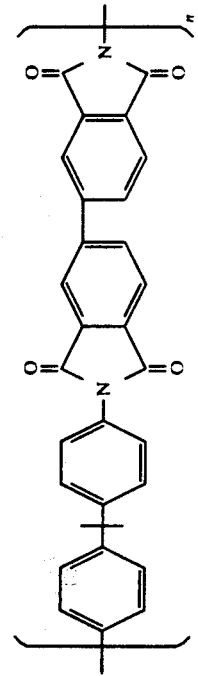 | 0.5[a]<br>Source: Prepared by Method D from Dianhydride II and Diamine V |
| Polyimide IX | 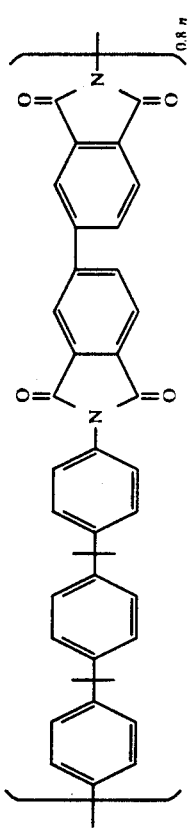 | 0.61[c]<br>Source: Prepared by Method A from a mixture of Dianhydrides II and IV and Diamine I |
| Polyimide X | 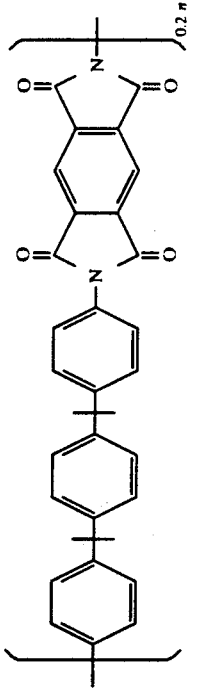 | 0.5[a]<br>Source: Prepared by Method D from Dianhydride V and Diamine I |
| Polyamide-imide I | 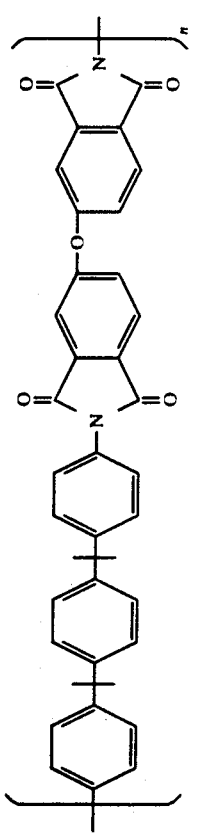 | Unknown<br>Source: Prepared by Method C from Anhydride-Acid Chloride I and Diamine I |

TABLE I-continued
Designations of the Polymers Used in the Experimental Examples

| Designation | Structure | R.V. (dl/g) |
|---|---|---|
| Polyamide-imide II | 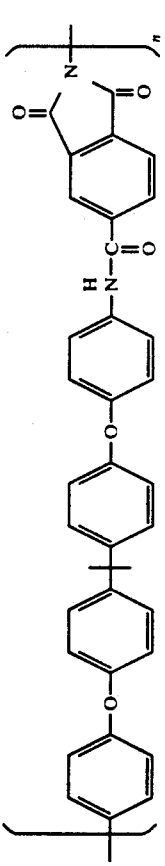 | Unknown<br>Source: Prepared by Method C from Ahydride-Acid Chloride I and Diamine II |
| Polyamide-imide III | 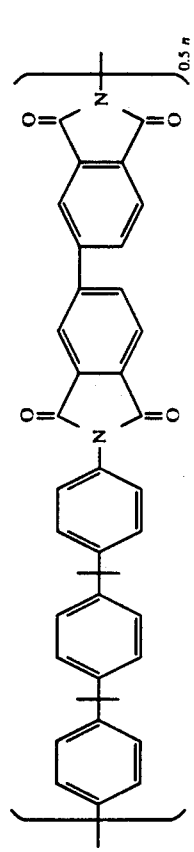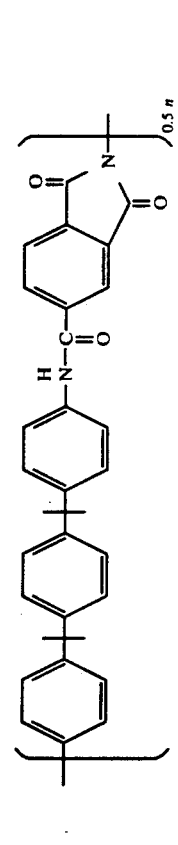 | 0.71c<br>Source: Prepared by Method C from a mixture of Dianhydride II and Anhydride-Acid Chloride I and Diamine I |
| Polyimide XI | 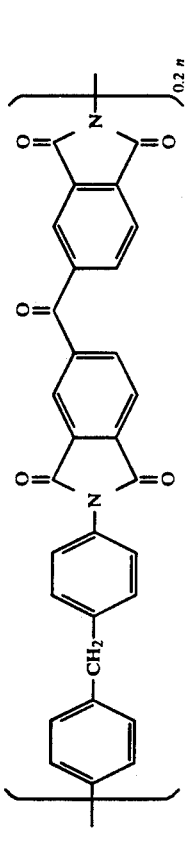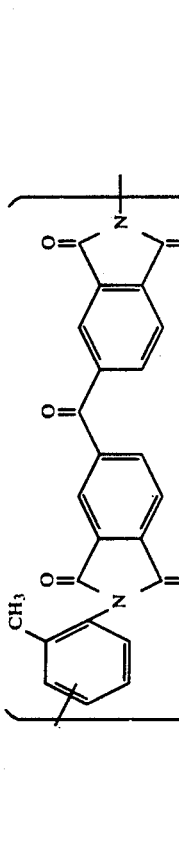 | Unknown<br>Source: Obtained from the Upjohn Co., North Haven, Conn., as Polyimide 2080 Powder. |

TABLE I-continued

Designations of the Polymers Used in the Experimental Examples

| Designation | Structure | R.V. (dl/g) |
|---|---|---|
| Polyimide XII | | Unknown<br>Source: Obtained from Ciba-Geigy Corp., Hawthorne, NY, as Polyimide XU218HP |
| Polyimide XIII | | 0.30[c]<br>Source: Prepared by Method A from Dianhydride I and Diamine VI |
| Polyamide-imide IV | | 0.35[c]<br>Source: Prepared by Method C from Anhydride-Acid Chloride I and Diamine VII |
| Polyamide-imide V | | Unknown<br>Source: Obtained from Amoco Chemical Co., Chicago, Ill. as Torlon 4203L. |

TABLE I-continued

Designations of the Polymers Used in the Experimental Examples

| Designation | Structure | R.V. (dl/g) |
|---|---|---|
| Poly(aryl ether ketone) I | ⟨structure⟩ | 1.2[d] Source: Prepared by Method given in U.S. Pat. No. 4,176,222. |
| Poly(aryl ether ketone) II | ⟨structure⟩ | 1.9[d] Source: Obtained from Raychem Corp., Menlo Park, CA., as Stilan 1000. |
| Poly(aryl ether ketone) III | ⟨structure⟩ | 1.2[d] Source: Prepared by Method given in U.S. Pat. No. 4,176,222. |

[a] as measured at 25° C. in N-methyl pyrolidone (NMP) (0.2 g/100 ml solution). The polymer was in its amide-acid form.
[b] as measured at 25° C. in choroform (0.2 g/100 ml solution).
[c] as measured at 25° C. in NMP (0.2 g/100 ml solution). The polymer was in its imidized form.
[d] as measured at 25° C. in 98% sulfuric acid (1% polymer solution).

TABLE II
Monomers Used in the Synthesis of the Polyimides and Amide Imides

| (Designation) | Dianhydrides | Anhydride-Acid Chlorides | Diamines |
|---|---|---|---|
| 1. | benzophenone tetracarboxylic dianhydride | trimellitic anhydride acid chloride | 4,4'-bis(4-aminophenyl)-p-terphenyl diamine |
| 2. | biphenyl tetracarboxylic dianhydride | | 1,4-bis(4-aminophenoxy)benzene type diamine |
| 3. | 4,4'-isopropylidene diphthalic anhydride | | m-phenylenediamine |
| 4. | pyromellitic dianhydride | | 4,4'-bis(4-aminophenyl) quaterphenyl diamine |
| 5. | oxydiphthalic anhydride | | 4,4'-methylenedianiline |
| 6. | | | bis[4-(3-aminophenoxy)phenyl] sulfone |

TABLE III

Mechanical Properties of Poly(imides)/Poly(aryl ether ketone) Blends at 23° C.

| Example | Description of The Composition | 1% Secant Modulus (ksi) | Tensile Strength (psi) | Yield Elongation (%) | Break Elongation (%) | Pendulum Impact Strength (ft-lb/in$^3$) |
|---|---|---|---|---|---|---|
| Control A | PI I | 299 | 14,500 | 10.5 | 11 | 66 |
| Example I | 50% PI I 50% PAEK I | 288 | 12,500 | 7.2 | 14 | 119 |
| Control F | PAEK I | 391 | 13,300 | 7.5 | 33 | 65 |
| Control B | PI II | 301 | 14,400 | 11.0 | 20 | 80 |
| Example II | 50% PI II 50% PAEK II | 326 | 13,800 | 6.3 | 46 | 108 |
| Control G | PAEK II | 373 | 12,000 | 5.0 | 31 | 75 |
| Control C | PI III | | | Too Brittle to Test | | |
| Example III | 40% PI III 60% PAEK I | 292 | 14,500 | 9.0 | 19 | 113 |
| Control D | PI IV | 250 | 13,000 | — | 10 | 80 |
| Example IV | 50% PI IV 50% PAEK I | 310 | 12,800 | 7.0 | 30 | 150 |
| Control E | PI V | | | Too Brittle to Test | | |
| Example V | 50% PI V 50% PAEK III | 280 | 16,000 | 10.0 | 11 | 38 |
| Control H | PAEK III | 407 | 14,500 | — | 7.0 | 29 |

TABLE IV

Glass Transition Temperatures of Poly(imide)/Poly(aryl ether ketone) Blends

| Example | Description of The Composition | Tg (°C.) by Modulus-Resilience Method | Tg (°C.) by DSC at 10° K./min |
|---|---|---|---|
| Control A | PI I | 265 | 263.4 |
| Example I | 50% PI I 50% PAEK I | 195 | 187.2 |
| Control F | PAEK I | 155 | 141. |
| Control B | PI II | 225 | 225.5 |
| Example II | 50% PI II 50% PAEK II | 200 | 184.8 |
| Control G | PAEK II | 165 | 152. |
| Control C | PI III | — | 260 |
| Example III | 40% PI III 60% PAEK I | 215 | 175 |
| Control D | PI IV | 295 | 290 |
| Example IV | 50% PI IV 50% PAEK III | 217 | 215 |
| Control E | PI V | — | 236 |
| Example V | 50% PI V 50% PAEK III | 220 | 191 |
| Control H | PAEK III | 170 | 150 |

TABLE VI

Mechanical Properties of Polyimide/Poly(aryl ether ketone) Miscible Blends at 23° C.

| Example | Description of The Composition | 1% Secant Modulus (ksi) | Tensile Strength (psi) | Yield Elongation (%) | Break Elongation (%) | Pendulum Impact Strength (ft-lb/in$^3$) | Mechanical Tg (°C.) | DSC Tg (°C.) |
|---|---|---|---|---|---|---|---|---|
| Control I | Polyimide VI | — | — | — | — | — | 260 | — |
| Example VI | 50% Polyimide VI 50% PAEK I | 303 | 13,000 | — | 9.3 | 94 | 195 | — |
| Control J | Polyimide VII | 350 | 14,000 | — | 8.0 | 60 | 300 | 295 |
| Example VII | 50% Polyimide VII 50% PAEK I | 350 | 13,000 | 7.0 | 30.0 | 150 | 220 | 215 |
| Control K | Polyimide VIII | 350 | 14,000 | — | 10.0 | 70 | 300 | — |
| Example VIII | 50% Polyimide VIII 50% PAEK I | 360 | 12,500 | 7.5 | 25.0 | 180 | 220 | 215 |
| Control L | Polyimide IX | 245 | 13,200 | 11.3 | 15.0 | 105 | 270 | |
| Example IX | 40% Polyimide IX 60% PAEK I | — | — | — | — | — | 195 | |
| Control M | Polyimide X | 300 | 14,500 | 10.5 | 12.0 | 70 | 260 | 260 |
| Example X | 50% Polyimide X 50% PAEK I | 290 | 12,500 | 7.2 | 15.0 | 120 | 195 | 187 |

TABLE VII

Mechanical Properties of Polyamide-imide/Poly(aryl ether ketone) Miscible Blends at 23° C.

| Example | Description of The Composition | 1% Secant Modulus (ksi) | Tensile Strength (psi) | Yield Elongation (%) | Break Elongation (%) | Pendulum Impact Strength (ft-lb/in$^3$) | Mechanical Tg (°C.) | DSC Tg (°C.) |
|---|---|---|---|---|---|---|---|---|
| Control | Polyamide-imide I | 289 | 14,300 | 10.4 | 13.0 | 97 | 270 | 272 |

TABLE VII-continued

Mechanical Properties of Polyamide-imide/Poly(aryl ether ketone) Miscible Blends at 23° C.

| Example | Description of The Composition | 1% Secant Modulus (ksi) | Tensile Strength (psi) | Yield Elongation (%) | Break Elongation (%) | Pendulum Impact Strength (ft-lb/in$^3$) | Mechanical Tg (°C.) | DSC Tg (°C.) |
|---|---|---|---|---|---|---|---|---|
| Example N | | | | | | | | |
| Example XI | 50% Polyamide-imide I 50% PAEK I | 275 | 12,200 | 7.7 | 17.0 | 135 | 200 | 194 |
| Control O | Polyamide-imide II | 270 | 12,800 | 9.1 | 36.0 | 200 | 230 | |
| Example XII | 50% Polyamide-imide II 50% PAEK I | 243 | 11,400 | 8.1 | 62.0 | >200 | 180 | |
| Control P | Polyamide-imide III | 288 | 13,900 | 10.0 | 12.0 | 64 | 255 | |
| Example XIII | 40% Polyamide-imide III 60% PAEK I | — | — | — | — | — | 189 | |

TABLE VIII

Experimental Verification of Immiscibility of Blends of PAEKs and Polyimides and Amide Imides that Do Not Contain Isopropylidene Linkages

| Example | Description of The Composition | Tg$_1$ | Tg$_2$ | Appearance of the Molded Blend |
|---|---|---|---|---|
| Control Q | Polyimide XI | 321 (DSC) | — | |
| Example XIV | 50% Polyimide XI 50% PAEK II | 163 | 300 | NA* |
| Control R | Polyimide XII | 320 (MECH) | — | |
| Example XV | 50% Polyimide XII 50% PAEK I | 175 (MECH) | 275 (MECH) | Opaque |
| Control S | Polyimide XIII | 225 (DSC) | — | |
| Example XVI | 50% Polyimide XIII 50% PAEK I | 140 (DSC) | 221 (DSC) | Opaque |
| Control T | Polyamide-imide IV | 210 (DSC) | — | |
| Example XVII | 40% Polyamide-imide IV 60% PAEK I | 140 (DSC) | 209 (DSC) | Opaque |
| Control U | Polyamide-imide V | 285 (MECH) | — | |
| Example XVIII | 40% Polyamide-imide V 60% PAEK I | 150 (MECH) | 280 (MECH) | NA* |

*This observation is not applicable since PAEK II and Polyamide-imide V both contained TiO$_2$. Thus, the blends would appear opaque whether or not they were one or two phase.

What is claimed is:

1. A blend comprising:
   (a) a poly(aryl ether ketone); and
   (b) an aromatic polymer, miscible with said poly(aryl ether ketone), which contains an isoalkylidene bridge and which is derived by the polycondensation of a polycarboxylic acid having the formula:

R(COOH)$_n$ or derivative thereof, wherein n is 3 or 4 and R is an aromatic radical selected from the group consisting of

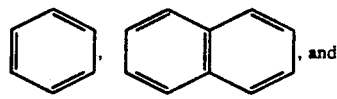, 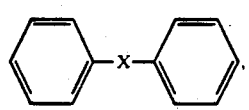

wherein X is selected from the group consisting of a chemical bond, O, S, SO, SO$_2$, —CO—,

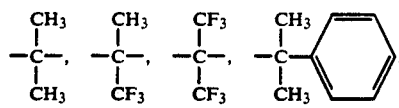

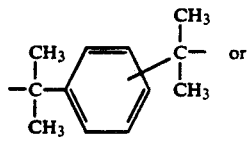

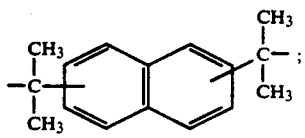

and a diamine having the formula:

H$_2$N—Ar—NH$_2$ wherein Ar is an aromatic radical selected from the group consisting of

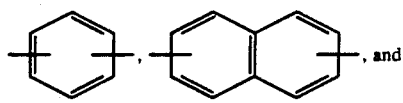, and
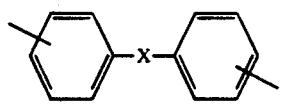,
wherein X is selected from the group consisting of a chemical bond, O, S, SO, SO$_2$, —CO—,
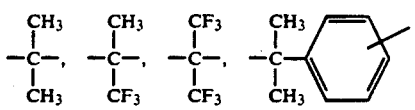,
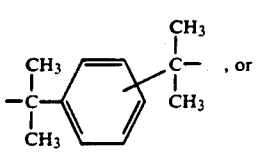, or
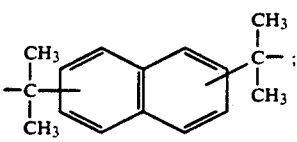
with the proviso that at least one of said R and Ar radicals comprises an isoalkylidene bridge.
2. The blend of claim 1 wherein said diamine is selected from the group consisting of
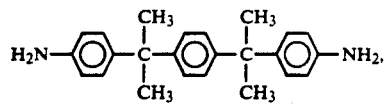,
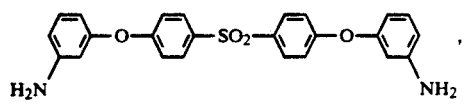,
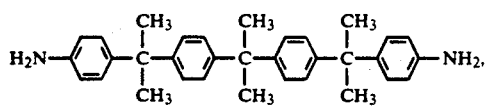,
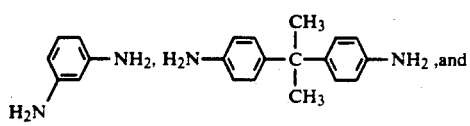, and
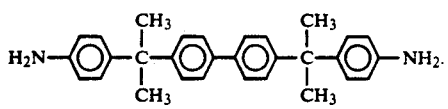.
3. A blend as defined in claim 1 wherein the poly(aryl ether ketone) is one or more of the following:
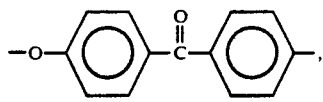,
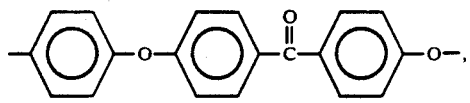,
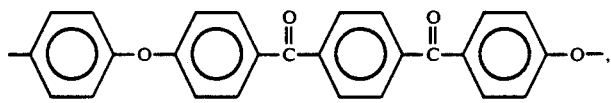,
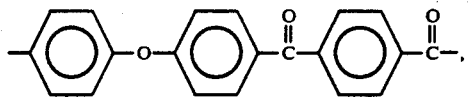,
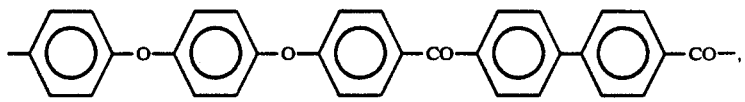,
,
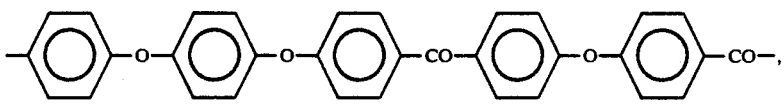, -continued
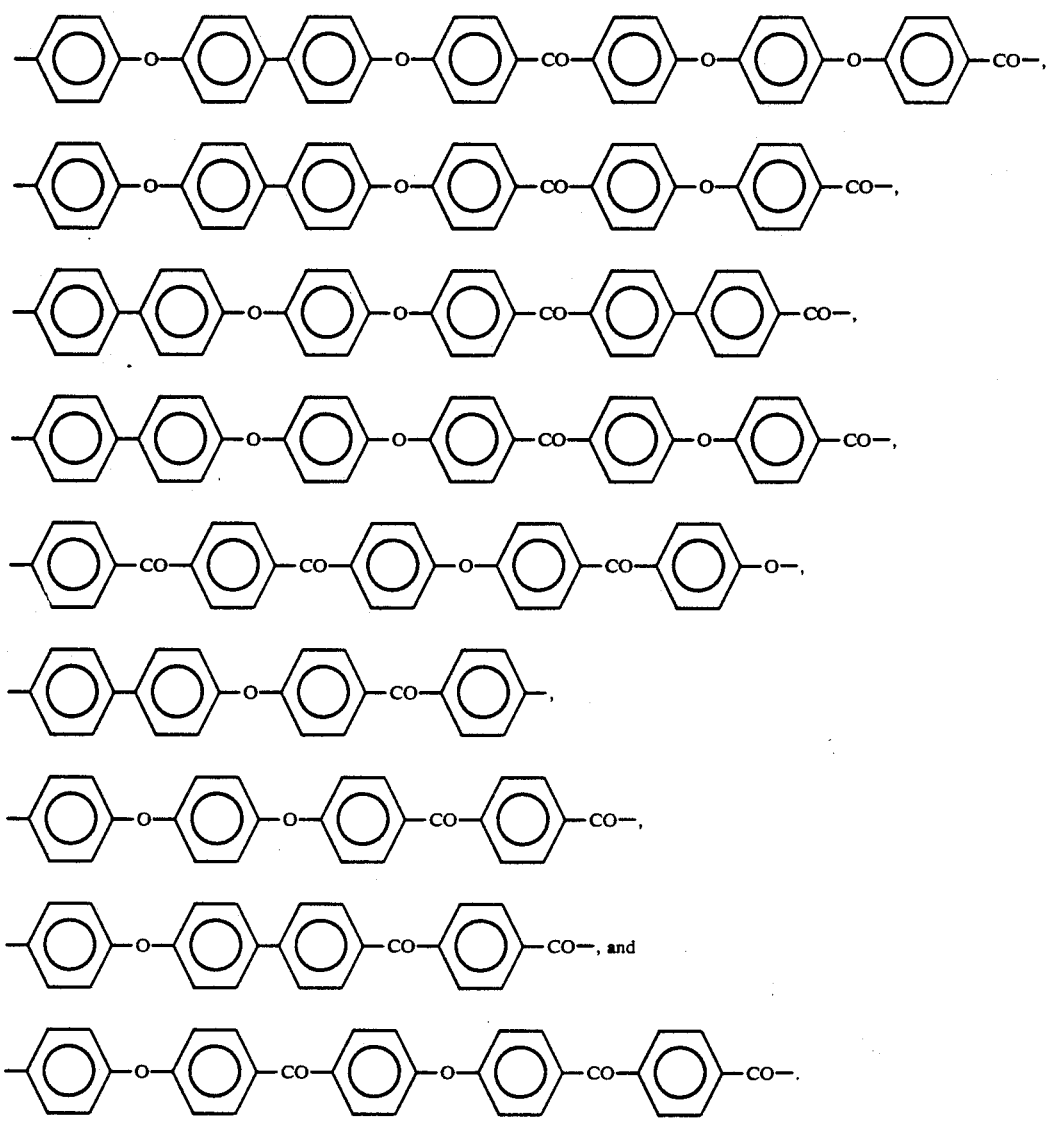
4. A blend as defined in claim 1 wherein the poly(aryl ether ketone) is of the following formula:
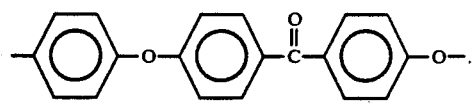
* * * * *

UNITED STATES PATENT OFFICE
CERTIFICATE OF CORRECTION

Patent No. 5,079,309                 Dated January 7, 1992

Inventor(s) Harris et al.

It is certified that error appears in the above-identified patent and that said Letters Patent is hereby corrected as shown below:

| Column | Line | |
|---|---|---|
| 3 | 54 | "poor floor properties" should read --poor flow properties-- |
| 43 | 68 | In the Markush grouping, delete "O". |
| 45 | 13 | In the Markush grouping, delete "O". |
| 46 | 12-14 | Delete the structure: |

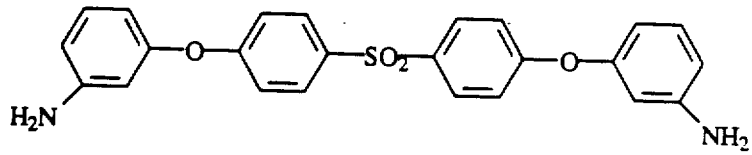

Signed and Sealed this

Eighteenth Day of May, 1993

Attest:

MICHAEL K. KIRK

Attesting Officer    Acting Commissioner of Patents and Trademarks